US012630179B1

(12) United States Patent     (10) Patent No.:   US 12,630,179 B1

Hu et al.           (45) Date of Patent:     May 19, 2026

(54) SIMULATED VEHICLE CONTROLLER TESTING USING ADVERSARIAL ASSISTANCE

(71) Applicant: Zoox, Inc., Foster City, CA (US)

(72) Inventors: Zhisheng Hu, Riverside, CA (US); Hamed Soroush, San Jose, CA (US); Andraz Kavalar, San Francisco, CA (US); Gerrit Bagschik, Goslar (DE); Sean Konz, San Francisco, CA (US); Angel de Jesus Avila, San Diego, CA (US)

(73) Assignee: Zoox, Inc., Foster City, CA (US)

( * ) Notice: Subject to any disclaimer, the term of this patent is extended or adjusted under 35 U.S.C. 154(b) by 180 days.

(21) Appl. No.: 18/471,943

(22) Filed: Sep. 21, 2023

(51) Int. Cl.
    *B60W 60/00*      (2020.01)
    *G05B 17/02*      (2006.01)
    *G08G 1/16*       (2006.01)

(52) U.S. Cl.
    CPC ........... *B60W 60/001* (2020.02); *G05B 17/02* (2013.01); *G08G 1/16* (2013.01); *B60W 2556/40* (2020.02); *B60W 2556/45* (2020.02)

(58) Field of Classification Search
    CPC ........... B60W 60/001; B60W 2556/40; B60W 2556/45; G05B 17/02; G08G 1/16
    See application file for complete search history.

(56) References Cited

U.S. PATENT DOCUMENTS 10,268,191 B1    4/2019   Lockwood et al.
10,817,610 B2 *   10/2020   Kumar .................... G06F 21/57

10,921,823 B2 *   2/2021   Miller, Jr. ............... H04W 4/46
10,976,732 B2     4/2021   Lockwood et al.
11,036,232 B2 *   6/2021   Shkurti ................ G05D 1/0221
11,150,660 B1 *   10/2021   Kabirzadeh ............. G06F 30/15
11,366,471 B2     6/2022   Lockwood et al.

(Continued)

FOREIGN PATENT DOCUMENTS

KR        102498357 B1 *   2/2023   ......... G01M 17/007
WO   WO-2018063245 A1 *   4/2018   ............. G01S 19/49

OTHER PUBLICATIONS

"Zhao, Tong; Yurtsever, Ekim; Paulson, Joel; Rizzoni, Giorgio; Formal Certification Methods for Automated Vehicle Safety Assessment; Mar. 3, 2022; IEEE" (Year: 2022).*

(Continued)

*Primary Examiner* — Ramya P Burgess
*Assistant Examiner* — Christopher R Cardimino
(74) *Attorney, Agent, or Firm* — Lee & Hayes, P.C.

(57)          ABSTRACT

This disclosure describes techniques for testing robustness of a vehicle controller to adversarial command provided by a teleoperation component. In some cases, a driving scenario is determined (e.g., based on recorded driving event(s) and/or based on modifications to recorded driving event(s)). After determining a driving scenario, an adversarial teleoperation command may be determined for the scenario that is predicted to increase (e.g., maximize) an expected damage measure. After determining the adversarial command, the command may be provided to a vehicle controller that controls operation(s) associated with a simulated vehicle in a simulation environment. The simulated behavior of the vehicle controller and/or the simulated vehicle may represent whether the vehicle controller is associated with a deficiency.

20 Claims, 6 Drawing Sheets

(56) References Cited

U.S. PATENT DOCUMENTS

| | | | |
|---|---|---|---|
| 11,404,217 B2 | 8/2022 | Chavan et al. | |
| 11,568,688 B2 * | 1/2023 | Maeta | G09B 9/042 |
| 11,977,386 B2 * | 5/2024 | Hari | G05B 13/027 |
| 11,999,364 B2 * | 6/2024 | Alvarez | G06N 3/047 |
| 2017/0285631 A1 * | 10/2017 | Bethke | G05D 1/222 |
| 2018/0357409 A1 * | 12/2018 | Jantz | G06F 21/44 |
| 2021/0020045 A1 | 1/2021 | Huang et al. | |
| 2022/0100635 A1 * | 3/2022 | Morley | G06F 11/3608 |
| 2022/0289253 A1 | 9/2022 | Hu et al. | |
| 2023/0056233 A1 * | 2/2023 | Cyr | H04W 12/009 |
| 2023/0234576 A1 * | 7/2023 | Jung | B60W 30/0956 |
| 2024/0383486 A1 * | 11/2024 | Kolaric | G06N 7/01 |

OTHER PUBLICATIONS

"Mousavinejad, Eman; Yang, Fuwen; Han, Qing-Long; Ge, Xiaohua; Vlacic, Ljubo; Distributed Cyber Attacks Detection and Recovery Mechanism for Vehicle Platooning; IEEE Transactions on Intelligent Transportation Systems, vol. 21, No. 9" (Year: 2020).*

* cited by examiner

400 ⌐

500

RECEIVE A DRIVING EVENT 502

TELEOP ACTIVATED? 504

YES

NO

DANGEROUS CONDITION DETECTED? 506

YES

NO

RECEIVE SCENARIO MODIFICATION(S) 510

DISCARD EVENT 508

GENERATE SYNTHEITC SCENARIO 512

SIMULATED VEHICLE CONTROLLER TESTING USING ADVERSARIAL ASSISTANCE

BACKGROUND

Autonomous vehicles may define routes and navigate along routes partially or entirely without the assistance of a human driver. Various driving simulation systems have been developed to assist with testing, updating, and maintaining operational software and hardware of autonomous vehicles, to ensure the safety and reliability of the vehicles prior to deployment. Simulated data and driving simulation systems can be used to test and validate features of autonomous vehicle systems, including features and functionalities that may be otherwise prohibitive to test in the real world due to safety concerns, time limitations, repeatability, and the like. For example, simulation systems may perform simulations based on driving scenarios to test and improve passenger safety, vehicle decision-making, sensor data analysis, and route optimization. However, there is a need for developing more efficient and comprehensive simulated testing solutions that can detect a larger number of vehicle deficiencies.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
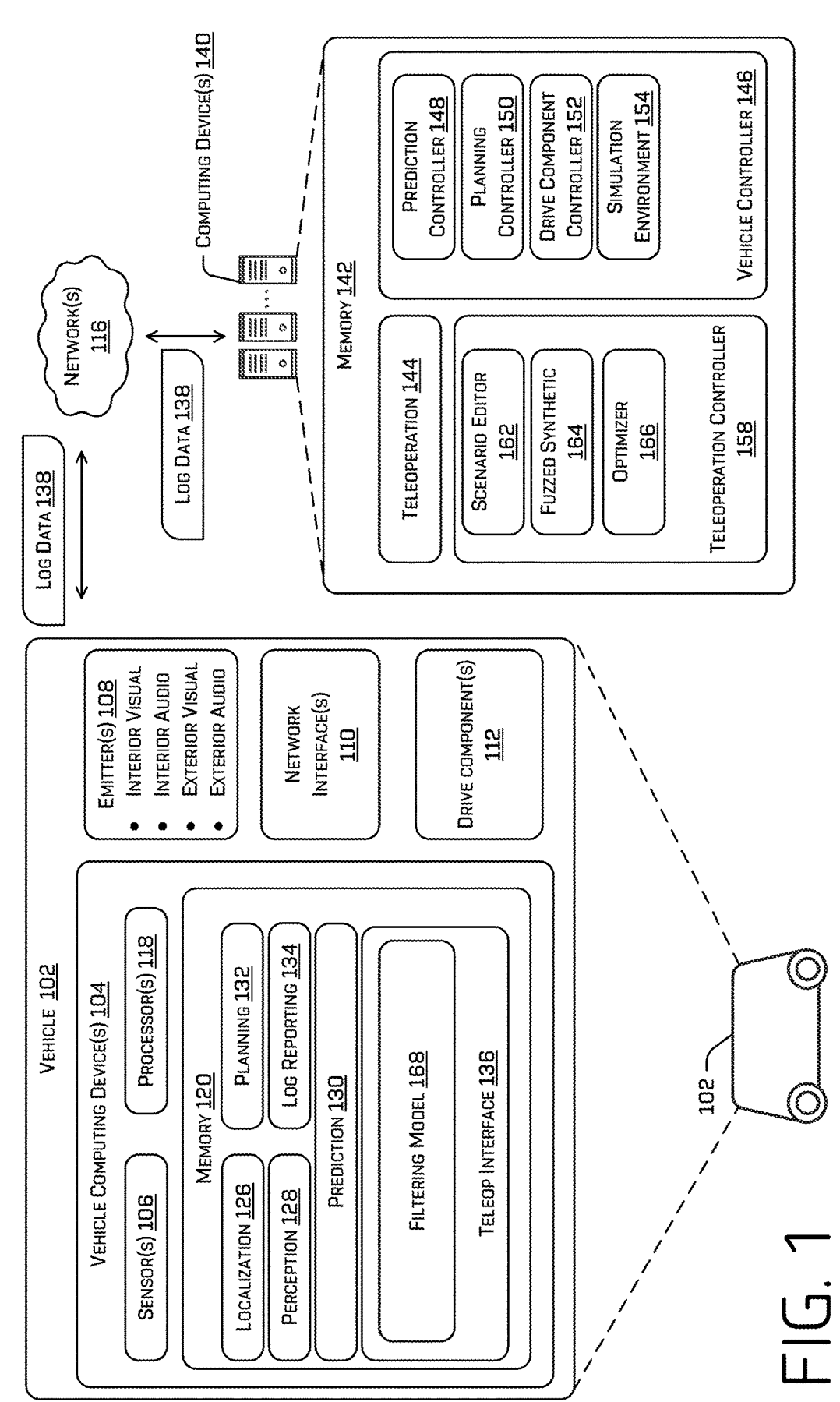
FIG. 1 illustrates a block diagram of an example system that implements the techniques discussed herein.

This disclosure describes techniques for testing robustness of a vehicle controller to adversarial command provided by a teleoperation component. In some cases, a driving scenario is determined (e.g., based on recorded driving event(s), based on modifications to recorded driving event(s), and/or otherwise generated). After determining a driving scenario, an adversarial teleoperation command may be determined for the scenario that is predicted to increase (e.g., maximize) an expected damage measure in simulation. Afterward a command-generating system generates the adversarial command, the command may be provided to a vehicle controller that controls operation(s) associated with a simulated vehicle in a simulation environment. The simulated behavior of the vehicle controller and/or the simulated vehicle may then be used to determine whether the vehicle controller is associated with a deficiency. A deficiency may represent a suboptimal, undesirable, and/or erroneous operational state of any component associated with the vehicle controller, such as the controller's prediction component, the controller's perception component, the controller's planning component, the controller's drive component, and/or the like.

In some cases, the techniques described herein include determining a driving scenario. A driving scenario may represent a state of a simulation environment that includes a simulated vehicle (e.g., an autonomous vehicle) controlled by a vehicle controller (e.g., an autonomous vehicle controller). A driving scenario may represent one or more vehicle conditions, one or more road conditions, one or more roadway configurations, and/or one or more environmental conditions associated with a vehicle environment. For example, the driving scenario may describe going through a four-way intersection with various simulated dynamic objects like vehicles, bicycles, and pedestrians.

In some cases, a driving scenario may be used to generate a simulation environment that includes a simulated vehicle. For example, the driving scenario may represent an intersection geometry, a lane configuration, a traffic light pattern, an initial condition and/or feature(s) associated with one or more simulated objects, the starting position of a simulated vehicle whose respective operations are being controlled by a vehicle controller, and/or the ending position of such a simulated vehicle. In some cases, the driving scenario may describe environmental conditions associated with the vehicle environment, such as lighting conditions, weather conditions, road surface conditions, and/or the like. In some cases, the driving scenario may describe behavioral parameter(s) and/or models that control how one or more dynamic objects move and interact over the course of the simulation.

In some cases, a driving scenario may be determined based on log data recorded by one or more vehicles. For example, log data from an autonomous vehicle may be processed to identify a recorded driving event that involved a request for teleoperation assistance. After identifying this event, a portion of the log data corresponding to the timeframe surrounding the corresponding teleoperation request may be extracted. The corresponding log data may contain sensor data, perception data, planning data, prediction data, localization data, vehicle state information, map data, and/or any teleoperation command instructions exchanged during the relevant timeframe. This extracted log data may then be used to determine a driving scenario for simulation. For example, the location, environmental conditions, vehicle state, and sensor perspectives associated with the timeframe associated with the teleoperation assistance may be extracted from the recorded data and used to construct a driving scenario. The resulting driving scenario may reflect challenging real-world conditions that required teleoperation assistance to enable testing and/or improvement of the autonomous vehicle systems that may operate under conditions associated with this scenario.

In some cases, a driving scenario may be determined by making one or more modifications to a recorded driving event. Modifications to driving events may be determined based on user-provided modification(s) and/or by generating random variations in scenario features (e.g., to introduce a degree of unpredictability and/or stochasticity into the resulting simulations). For example, a user may be configured to modify a recorded driving event by adding and/or removing one or more objects (e.g., vehicles and/or pedestrians) with predefined movement profiles at various locations of a corresponding environment; changing road geometry features like the number of lanes and/or lane width; changing traffic lights patterns and/or timings; changing ambient conditions like weather, time of day, and/or sun's position; changing road surface friction to simulate conditions such as ice and/or rain; and/or moving an object from a first location in the corresponding environment to a second location in the corresponding environment. Example techniques for determining driving scenarios and/or parameterizing driving scenarios are described in U.S. Pat. No. 10,976,732, entitled "Predictive Teleoperation Situational Awareness" and filed on Feb. 27, 2019, which is incorporated by reference herein in its entirety and for all purposes.

In some cases, an example system modifies a driving scenario by introducing one or more random variations into the driving scenario. The objective behind this random variation may be to make simulated testing more robustness against unpredictable roadway and/or environmental conditions. For example, the system may modify a driving scenario by applying simulated sensor noise like random pixel dropouts in camera frames and/or radar reflections; varying movement profiles (e.g., speed and/or acceleration profiles of dynamic objects (e.g., vehicles); changing locations of objects and/or obstacles by random amounts between different simulation iterations; changing weather patterns and/or precipitation conditions randomly; and/or adding random defects to a road geometry like potholes.

In some cases, the techniques described herein include determining a teleoperation command that increases (e.g., maximizes) an expected damage measure associated with a simulation of a driving scenario. A teleoperation command may be a command provided by a remote system to a vehicle computing device based on (e.g., in response to) a request by the vehicle computing device for such a command. In some cases, when the vehicle computing device determines that responding to a detected driving scenario requires external assistance, the vehicle computing device transmits a request for teleoperation assistance to a teleoperation component to receive a teleoperation command from the teleoperation component. In some cases, teleoperation component may perform at least some of the techniques described in U.S. Pat. No. 10,268,191, filed Jul. 7, 2017, and entitled "Predictive Teleoperation Situational Awareness," which is incorporated by reference herein in its entirety and for all purposes. In some cases, determining a teleoperation command that increases an expected damage measure includes determining a command that is more likely to result in a collision given a driving scenario. Determining such a command may be performed by receiving a candidate command and fuzzing and/or perturbing one or more parameters associated with the command based on the resilience of the system to collision given that command.

In some cases, during simulated testing, an example system may determine, given a driving scenario, which teleoperation command may cause a vehicle controller that controls operations associated with a simulated vehicle to take actions that increases (e.g., maximizes) the resulting damage to the simulated vehicle and/or to one or more objects (e.g., other simulated vehicles, simulated pedestrians, road signs, and/or the like) in the simulation environment. Determining such an "adversarial" teleoperation command and transmitting it to the vehicle controller during simulation enables the system to determine the operation of the vehicle controller under adversarial and/or abnormal teleoperation behavior (e.g., resulting from teleoperation command provided by an adversarial party that may have hijacked the teleoperation component). In some cases, a vehicle controller and/or a corresponding vehicle (e.g., a vehicle whose operations are being simulated by the vehicle controller) may only be validated if the simulated behavior of the vehicle controller after transmission of an adversarial teleoperation command to the controller does not indicate a deficiency.

In some cases, to determine an adversarial teleoperation command given a driving scenario, an example system uses a damage model that relates one or more command parameters to an expected damage measure. A command parameter may represent a feature of a recommended behavior (e.g., a recommended trajectory) associated with a corresponding teleoperation command. The command parameter(s) may describe one or more features of a recommended driving behavior described by the corresponding command. Examples of command parameters include one or more recommended vehicle speeds associated with a recommended driving behavior, one or more recommended vehicle accelerations associated with a recommended driving behavior, one or more waypoint locations associated with a recommended driving trajectory, a brake profile for a recommended driving behavior, and/or the like.

In some cases, the techniques described herein are implemented in the context of a system in which a teleoperation component provides a command to a vehicle and the vehicle determines a trajectory by determining validity of the teleoperation component (e.g., using a planner component and/or a trajectory validation component) based on its sensor data. Aspects of such a system are described in U.S. Pat. No. 11,366,471, entitled "Teleoperation Situational Awareness," and filed on Feb. 13, 2020, which is incorporated by reference herein in its entirety and for all purposes. In some cases, the techniques described herein detect instances in which the vehicle fails to properly validate a command.

In some cases, an example system may use sensor data, map data, and/or data about historical travel patterns to assess which teleoperation commands may result in a collision. For example, an intersection may appear free of other agents (e.g., due to occlusions) but prior data may indicate that traveling through the intersection frequently results in collisions. The system may factor in such risks not evident from immediate sensor data in assessing a command to travel through the intersection. As another example, certain commands like an emergency stop may have different risks depending on the roadway environment in which the vehicle receives the command (e.g., on a highway versus a side street based on average speeds and traffic patterns). The system may assess teleoperation commands based on these contextual considerations.

In some cases, each driving scenario type may be associated with a different set of command parameters. For example, for a scenario involving a vehicle pulling out of a parking spot into an active lane of traffic, the command parameters may include the recommended timing, distance, and/or acceleration for pulling out, a recommended target lane, a recommended speed once in target lane, and/or the like. Determining values for these parameters that maximize an expected damage measure may enable determining an adversarial command that provides for pulling out and lane changing in an aggressive and/or unsafe manner. As another example, for a scenario involving a vehicle approaching a stale yellow traffic light, the command parameters may include recommended braking force, steering angle, acceleration for proceeding through the intersection, target speed while crossing, and/or distance from the stop line. Determining values for these parameters that maximize an expected damage measure may enable determining an adversarial command that provides for running a yellow light in an unsafe manner. As an additional example, for a scenario involving a vehicle approaching a left turn across oncoming traffic, the command parameters may include timing of the left turn, speed during the left turn, and/or positioning before the left turn.

In some cases, the damage model used to determine an adversarial teleoperation command relates a set of command parameters to an expected damage measure that represents an expected outcome if a vehicle controller that controls operations of a simulated vehicle receives a teleoperation command characterized by the set of command parameters. For example, given a driving scenario with an obstacle blocking the lane, command parameters may include recommended speed and lateral offset. In this example, the damage model may predict that a command with high speed and small lateral offset could cause a high-impact collision due to the vehicle controller failing to stop in time. An optimization process may then use this damage model to systematically search the command parameter space to determine the most damaging teleoperation command for testing the controller's limitations.

In some cases, the damage model is iteratively refined based on simulated outcomes detected after providing adversarial teleoperation command to a vehicle controller. For example, in some cases, after determining an adversarial teleoperation command that maximizes an expected damage measure associated with a driving scenario, an example system causes the teleoperation component to transmit this command to the vehicle controller during a simulation of the driving scenario. The example system may then determine the outcome of the simulation and use this outcome data to determine an observed damage measure. This observed damage measure may then be used to update a damage model. The updated damage model may then be used to determine a new set of command parameters that maximize the expected reward measure in accordance with the updated damage model. This new set of command parameters may be used to determine a new adversarial teleoperation command which may be transmitted to the vehicle controller during the simulation. In this manner, an iterative optimization process based on the feedback provided by simulation outcome(s) may be performed until a stopping condition is reached (e.g., for a predefined number of iterations, until the expected damage measure exceeds a threshold, until the damage resulting from the simulation outcome exceeds a threshold, and/or the like).

In some cases, an example system may be configured to: (i) given a driving scenario reflected in the state of a simulation environment, determine a command that, if provided to the vehicle controller, causes an expected damage measure associated with the simulation environment to increase (e.g., be maximized), (ii) cause the teleoperation component to provide the command during simulation of the driving scenario, and (iii) determine a simulation metric associated with the simulation. In some cases, the example system may be configured to: (i) retrieve a damage model that relates one or more teleoperation command parameters to an expected damage measure (e.g., representative of the expected outcome of providing a teleoperation command associated with the parameter(s) to the vehicle controller during a simulation of a driving scenario), (ii) determine, based on the damage model, value(s) for the parameter(s) that increase (e.g., maximize) the expected damage measure, (iii) determine a command based on the determined parameter value(s), (iv) cause the determined command to be provided to the vehicle controller during a simulation of the driving scenario, (v) determine a simulated damage measure resulting from the simulation, (vi) update the damage model based on the simulated damage measure, and (vii) return to operation (i) if the stopping condition has not been satisfied.

In some cases, the simulated damage measure used to update the damage model is determined based on a simulation metric that may be determined based on a deviation between a recommended behavior of the vehicle controller in accordance with an adversarial teleoperation command and a simulated behavior of the vehicle controller during the simulation. For example, the adversarial command may recommend an aggressive acceleration and lane change behavior. The simulated behavior of the vehicle controller during the simulation may deviate from this recommendation if its planning system rejects the unsafe advice. The simulation metric may quantify this deviation, for example by measuring differences in actual driven speed, lane position, and/or acceleration compared to the values recommended in the adversarial command. A larger deviation may indicate that the vehicle controller rejected or significantly altered the recommended behavior and avoided its potential damages. Conversely, a small deviation may indicate the vehicle controller largely followed the selected command and incurred greater resulting damage. This relationship between command adherence deviation and simulated damage outcome may be incorporated into the damage model to improve its accuracy. For example, in some cases, over multiple simulations, the deviations are logged and correlated to the resulting damage measures. Machine learning techniques may then train the damage model to better predict expected damage measures using the deviations. The updated damage model may in turn be used by the optimization process to generate more effective adversarial command that balances unsafe behaviors with the level of adherence from the vehicle controller.

In some cases, the expected damage measure associated with a teleoperation command is determined in a manner that reflects both a likelihood that a vehicle controller accepts the corresponding command (e.g., operates in accordance with the corresponding command) and the damage resulting from acceptance of the corresponding command (e.g., the damage resulting from the vehicle controller being operated in accordance with the corresponding command). In some cases, if a command is likely to be rejected by the vehicle controller (e.g., by a planning component of the vehicle controller, by a collision avoidance component of the vehicle controller, and/or the like), the command is likely to be associated with a low expected damage measure even if the resulting damage from the command, if accepted, is high. In some cases, the system may determine an expected damage measure associated with a teleoperation command based on (e.g., as the product of): (i) the likelihood (e.g., from zero to one) that the vehicle controller accepts and follows the command based on the controller's safety and/or planning checks, and (ii) the magnitude (e.g., a normalized measure of magnitude) of damage predicted to occur if the controller follows the command (e.g., calculated using a driving simulator that operates a simulated vehicle in accordance with the recommended behavior associated with the command). In some cases, a component of the vehicle computing device (e.g., a planner component and/or a trajectory validation component) receives a teleoperation command, processes the teleoperation command in accordance with a cost function, and uses the output of the cost function to determine a trajectory for the vehicle. The trajectory may be used to control the vehicle if the trajectory is validated by a trajectory validation component of the vehicle computing device.

For example, consider a scenario involving a vehicle approaching a busy intersection. Given this scenario, an example system may evaluate a teleoperation command that recommends accelerating through a red light without slowing down by determining that: (i) the command has a high potential for damage if followed by the vehicle controller, and (ii) the vehicle controller's planning and/or collision avoidance systems are likely to reject this command as unsafe and adopt a different behavior (e.g., adopt a stopping trajectory) instead. Accordingly, despite high damage potential, the system may reject adopting the teleoperation command as the adversarial command because of a low acceptance likelihood. In this example, the high-damage red light running command would have a low acceptance likelihood, so the expected damage measure would be low overall. The optimization process may use a damage model that integrates this understanding to avoid exploring easily rejected command, and instead find parameter values for command that is sufficiently unsafe but also likely to be followed. This increases the robustness of adversarial simulated testing performed using adversarial teleoperation command determined by that optimization process.

In some cases, the techniques described herein include determining a deficiency associated with a vehicle controller based on the outcome of a simulation performed in relation to the vehicle controller in which the controller is provided an adversarial teleoperation command. In some cases, after an adversarial teleoperation command is provided to a vehicle controller associated with a simulated vehicle, the simulation is performed. The vehicle controller may then be configured to process the command along with other data (e.g., vehicle state data, environmental condition data, and/or the like) to continue the simulation and determine a simulated behavior for the vehicle. The simulated behavior may then determine whether at least one component of the vehicle controller is associated with a deficiency. For example, acceptance of a threshold portion and/or a critical portion of the recommended behavior described by an adversarial command may indicate that the vehicle controller is not operating in a reliable manner.

In some cases, an example system may perform remedial action(s) to address detected deficiency(s) associated with a vehicle controller. Examples of remedial actions include not validating the vehicle controller, determining training data for a command filtering system based on the deficiency, notifying a quality assurance team, and/or the like. In some cases, if no deficiency is detected, the vehicle controller and/or a corresponding vehicle may be validated and/or approved.

In some cases, the techniques described herein enhance the safety of autonomous vehicles by enabling rigorous evaluation of vehicle safety. In some cases, an example system may use adversarial teleoperation commands to evaluate a vehicle's robustness against adversarial and/or abnormal teleoperation behavior (e.g., resulting from teleoperation command provided by an adversarial party that may have hijacked the teleoperation component). In some cases, a vehicle controller and/or a corresponding vehicle (e.g., a vehicle whose operations are being simulated by the vehicle controller) may only be validated if the simulated behavior of the vehicle controller after transmission of an adversarial teleoperation command to the controller does not indicate a deficiency.

In some cases, the techniques described herein enhance efficiency of vehicle testing by enabling simulated testing of teleoperation robustness aspects. Simulated testing is more efficient than real-world testing. For example, simulating diverse hazardous scenarios is much less resource-intensive than physically driving real vehicles through such scenarios. In some cases, an example system may use scalable simulation platforms and/or parallel computation to evaluate many adversarial command test cases in a short amount of time and without requiring real-world testing. Accordingly, in some cases, the techniques described herein improve the efficiency and resource-intensiveness of vehicle validation processes.

In some cases, the techniques described herein enable storage-efficient vehicle data collection. In some cases, instead of recording a large number of driving events, an example system may store a smaller number of events and use those events to generate synthetic scenarios. Scenario diversity may be enabled by user-provided modifications and/or random programmatic variations. This approach may both reduce the need for storing vehicle log data and the need for network resources to transmit vehicle log data to backend systems.

The techniques described herein may be implemented in a number of ways. Example implementations are provided below with reference to the following figures. Example implementations are discussed below in which the delivery vehicles are implemented as autonomous vehicles. However, the methods, apparatuses, and systems described herein may be applied to fully or partially autonomous delivery vehicles, robots, and/or robotic systems and are not limited to autonomous vehicles. Moreover, at least some of the techniques described herein may be utilized with driver-controlled vehicles and/or semi-autonomous vehicles. While various techniques described herein relate to simulated testing of vehicles and/or vehicles controllers, a person of ordinary skill in the relevant technology will recognize that the techniques described herein may be used in relation to real-world testing of vehicles and/or vehicle controllers.

FIG. 1 illustrates a block diagram of an example system 100 that implements the techniques discussed herein. In some instances, the example system 100 may include a vehicle 102 and one or more computing devices 140. As depicted in FIG. 1, the vehicle 102 may provide log data 138 to the computing device(s) 140. Log data 138 may include sensor data, perception data, planning data, and/or prediction data recorded during the operation of the vehicle 102.

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. Moreover, in some instances, the techniques described herein may be usable by non-autonomous vehicles as well.

As depicted in FIG. 1, the vehicle 102 includes sensor(s) 106, emitter(s) 108, network interface(s) 110, drive component(s) 112, and/or vehicle computing device(s) 104. The sensors 106 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 106 may include multiple instances of each of these or other types of sensors. For example, the radar sensors may include individual radar sensors located at the corners, front, back, sides, and/or top of the vehicle 102. As another example, the cameras may include multiple cameras disposed at various locations about the exterior and/or interior of the vehicle 102. The sensor(s) 106 may provide input to the vehicle computing device(s) 104 and/or to computing device(s) 140.

The emitter(s) 108 may be configured to emit light and/or sound. The emitter(s) 108 may include interior audio and visual emitter(s) to communicate with passengers of the vehicle 102. In some instances, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 108 may also include exterior emitter(s). In some instances, the exterior emitter(s) include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which may use acoustic beam steering technology.

The network interface(s) 110 may enable communication between the vehicle 102 and one or more other local or remote computing device(s), such as with the network 116. For example, the network interface(s) 110 may facilitate communication with other local computing device(s) on the vehicle 102 and/or the drive component(s) 112. Also, the network interface(s) 110 may additionally or alternatively allow the vehicle to communicate with other nearby computing device(s) (e.g., other nearby vehicles, traffic signals, etc.). The network interface(s) 110 may additionally or alternatively enable the vehicle 102 to communicate with computing device(s) 140 via the network 116. In some examples, computing device(s) 140 may comprise one or more nodes of a distributed computing system (e.g., a cloud computing architecture). The network interface(s) 110 may include physical and/or logical interfaces for connecting the vehicle computing device(s) 104 to another computing device or a network, such as network(s) 116. For example, the network interface(s) 110 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

The drive component(s) 112 may include one or more vehicle components that enable the vehicle 102 to operate. The drive component(s) 112 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 112 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 112. Furthermore, the drive component(s) 112 may also include one or more communication connection(s) that enable communication by the respective drive component with one or more other local or remote computing device(s).

The vehicle computing device(s) 104 may include processor(s) 118 and memory 120 communicatively coupled with the processor(s). Processor(s) 118 may include any suitable processor capable of executing instructions to process data and perform operations as described herein. In some instances, the processor(s) 118 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 120 may be an example of non-transitory computer-readable media. Memory 120 may store an operating system and one or more software applications, instructions, programs, and/or data to implement the methods described herein and the functions attributed to the various systems. In various implementations, the memory 120 may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 120 stores a localization component 126, perception component 128, prediction component 130, planning component 132, log reporting component 134, and/or teleoperation interface component 136. In some cases, at least one of the components stored in the memory 120 may be executed by processing hardware, such as GPU(s), CPU(s), and/or other processing units.

The localization component 126 may include hardware and/or software to receive data from the sensor(s) 106 to determine a position, velocity, and/or orientation of the vehicle 102 (e.g., one or more of an x-, y-, z-position, roll, pitch, or yaw). For example, the localization component 126 may include and/or request/receive map(s) of an environment and may continuously determine a location, velocity, and/or orientation of the autonomous vehicle within the map(s). In some instances, the localization component 126 may utilize SLAM (simultaneous localization and mapping), CLAMS (calibration, localization, and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 126 may provide data to various components of the vehicle 102 to determine an initial position of an autonomous vehicle for generating a trajectory and/or for generating map data, as discussed herein. In some examples, localization component 126 may provide, to at least one of the perception component 128 or the prediction component 130, a location and/or orientation of the vehicle 102 relative to the environment and/or sensor data associated therewith.

The perception component 128 may include a primary perception system and/or a prediction system implemented in hardware and/or software. The perception component 128 may detect object(s) in in an environment surrounding the vehicle 102 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like.

Prediction component 130 may include functionality to generate predicted information associated with objects in an environment. As an example, the prediction component 130 may be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein may be implemented to predict locations of other objects (e.g., vehicles, bicycles, pedestrians, and the like) as vehicle 102 traverses an environment. In some examples, the prediction component 130 may generate one or more predicted positions, predicted velocities, predicted trajectories, etc., for such target objects based on attributes of the target object and/or other objects proximate the target object.

Planning component 132 may receive a location and/or orientation of the vehicle 102 from the localization component 126, perception data from the perception component 128, and/or predicted trajectories from the prediction component 130 and may determine instructions for controlling operation of the vehicle 102 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the drive component(s) 112 may parse/cause to be carried out, second instructions for the emitter(s) 108 may be formatted according to a second format associated therewith). In at least one example, the planning component 132 may comprise a nominal trajectory generation subcomponent that generates a set of candidate trajectories and selects a trajectory for implementation by the drive component(s) 112 based at least in part on determining a cost associated with a trajectory. In some cases, the planning component 132 may perform techniques described in at least one of U.S. Patent Application No. 2021/0020045, filed Jul. 19, 2019, and entitled "Unstructured Vehicle Planner" and/or U.S. Pat. No. 11,404,217, filed May 11, 2020, and entitled "Methods of Incorporating Leaker Devices into Capacitor Configurations to Reduce Cell Disturb, and Capacitor Configurations Incorporating Leaker Devices," both of which are incorporated herein by reference in their entireties and for all purposes.

Log reporting component 134 may be configured to provide log data 138 to the computing device(s) 140. Log data 138 may include at least one of sensor data captured by the sensor(s) 106, localization data generated by the localization component 126, perception data generated by the perception component 128, prediction data generated by the prediction component 130, planning data generated by the planning component 132, or teleoperation command data received by the teleoperation interface component 136. In some cases, the log data 138 may represent data associated with one or more scenarios, where a scenario may be a sequence of vehicle observations and/or vehicle actions performed in a respective time period. The log data 138 may comprise sensor data, perception data, and/or scenario labels collected/determined by the vehicle 102 (e.g., by the perception component 128), as well as any other message generated and or sent by the vehicle 102 during operation including, but not limited to, control messages, error messages, etc. In some examples, the vehicle 102 may transmit the log data 138 to the computing device(s) 140. The vehicle 102 and/or the computing device(s) 140 may execute a pre-processing operation that includes identifying different scenarios in the log data and/or perception data associated therewith. A scenario may comprise a layout of the environment (e.g., four-way controlled intersection, three-way uncontrolled intersection, six-way controlled intersection, two-lane highway, one-way direction of travel) a number, type, and/or configuration of objects in the scenario. The configuration may identify the position, orientation, and/or trajectory/velocity of the objects. The techniques may comprise aggregating the log data and perception data associated with the same scenario from log data and perception data received from one or more autonomous vehicles over a data-gathering period.

In some examples, the computing device(s) 140 may identify one or more scenarios based at least in part on the log data, which may also comprise defining a scenario. For example, the computing device(s) 140 may determine an environmental layout, a number, type, and a configuration of object(s) in the environment and/or associate this definition with one or more portions of log data associated with that scenario. In some examples, the log data 138 may comprise (historical) perception data that was generated on the vehicle 102 during operation of the vehicle. In an additional or alternate example, the perception data may include perception data generated during a simulation. In some examples, the scenario may indicate characteristics of the environment such as, for example, a position, orientation, movement, and/or characteristics (e.g., materials, height, width, depth, luminance) of one or more objects. For example, the environment may comprise one or more static objects and/or one or more agents (e.g., dynamic objects) in a configuration specified by the scenario that is to be simulated. In some examples, any of the dynamic objects instantiated in the scenario may be controlled based at least in part on the output of an agent behavior model.

Teleoperation interface component 136 may be configured to provide requests for providing instructions for teleoperation command to a teleoperation component 144, receive teleoperation command from a teleoperation component 144, and provide the command to the planning component 132. Teleoperation interface component 136 may use a machine-learned model to predict, from vehicle data (e.g., sensor data, localization data, perception data, prediction data, and/or planning data), when to engage the teleoperation component 144 (e.g., when to send a request for assistance from a driverless vehicle to a teleoperations device. In an example instance, the model might receive a request for assistance in view of an event labeled "construction zone: flagger" and, based on evaluation of the model using this data, the model may be used to decide to output instructions to present a video of a front-facing camera of the driverless vehicle on a display available to the teleoperation (i.e., an example of a presentation configuration) and instructions to present an option at the display for the teleoperation to indicate to the vehicle when the flagger is waving the driverless vehicle into an intersection (i.e., an example of an option). In some cases, teleoperation interface component 136 may perform at least some of the techniques described in U.S. Pat. No. 10,268,191, filed Jul. 7, 2017, and entitled "Predictive Teleoperation Situational Awareness," which is incorporated by reference herein in its entirety and for all purposes.

In some cases, the teleoperation interface component 136 may include a filtering model 168 configured to receive teleoperation command(s) from the teleoperation component 144 during operation of vehicle 102 and determine if the received command(s) are adversarial. The filtering model 168 may be trained based on data from past simulations performed using vehicle controller 146. If a command is determined to lead to a collision under a particular simulated scenario, the command-scenario pair may be used to generate a training sample indicating that the command is adversarial under the particular scenario. The filtering model 168 may be a supervised model, such as a likelihood model or binary classifier. The filtering model 168 may determine the likelihood a command is adversarial given a scenario and/or classify a command as adversarial or not adversarial given a scenario based on a representation of the command and a representation of the scenario. The scenario representation may be determined based on map or sensor data associated with the environment of the vehicle during the occurrence of the driving scenario. In some cases, the filtering model 168 is configured to receive teleoperation commands from the teleoperation component 144 during the operation of vehicle 102 and determine if the received commands are adversarial. The filtering model 168 may be trained based on data generated from past simulations using vehicle controller 146. In some cases, the training data for filtering model 168 may be generated as follows: vehicle controller 146 may be used to simulate various driving scenarios.

For a given scenario, optimizer 166 may determine a teleoperation command that is optimized to increase (e.g., maximize) an expected damage measure for that scenario. This optimized adversarial command is provided to the vehicle controller 146 during the simulation. Based on the simulated behavior of the vehicle controller 146 in response to the adversarial command, a determination is made about whether the command causes a failure condition, such as a collision condition. If the simulated behavior of vehicle controller 146 when provided the adversarial command results in a failure like a collision, then the command-scenario pair is labeled as a positive training example for the filtering model 168. On the other hand, if vehicle controller 146 avoids a collision and failure when provided with the adversarial command, then the command-scenario pair may be labeled as a negative training example. By simulating various scenarios using the vehicle controller 146 and optimizing adversarial commands to maximize damage, numerous labeled training examples can be generated. The filtering model 168 may then be trained on this labeled dataset in a supervised manner. The training process may update the parameters of the filtering model 168 to correctly predict the adversarial or non-adversarial labels for new command-scenario instances.

In some cases, the filtering model 168 may include a likelihood model trained to output the probability that a given command will be adversarial under a particular scenario. In other cases, the filtering model 168 may include a binary classifier trained to categorize new commands as either adversarial or non-adversarial for a given scenario. The filtering model 168 may use a variety of machine learning techniques, including but not limited to logistic regression, neural networks, support vector machines, decision trees, and random forests.

In some cases, the filtering model 168 may receive input data representing a driving scenario that vehicle 102 is faced with and a command provided by the teleoperation component. The scenario representation may be determined based on a real-world driving scenario and may represent data such as objects present in the scenario, road geometry associated with the scenario, environmental conditions associated with the scenario, and/or the like. The command representation may include parameters of the recommended trajectory associated with the command, such as at least one of one or more vehicle speeds recommended by the command and/or data representing one or more waypoints recommended by the command. In some cases, during the vehicle's operation, when vehicle 102 requests and receives a teleoperation command from the teleoperation component 144, the command is passed to the filtering model 168. The filtering model 168 may also receive a representation of the current driving scenario determined based on vehicle sensor data and/or map data. The filtering model 168 may then output a prediction about whether the command should be considered adversarial in the current context as defined by the observed driving scenario.

In some cases, if the filtering model 168 determines that a received command is received (e.g., that the probability of the command being adversarial is higher than a configured threshold), the command may be discarded and vehicle 102 may take remedial actions such as asking the teleoperation component 144 to provide an updated command, switching to a backup teleoperation system, executing a safe retraction maneuver (e.g., a recommended trajectory or a recovery trajectory, such as a stopping trajectory), such as pulling over and stopping, and/or providing warnings to vehicle passengers that teleoperation is behaving abnormally. In some cases, if the command is tagged as adversarial, this event and data may also be logged for quality assurance purposes, for example to check for any potential deficiency of the vehicle and/or the teleoperation component 144. In some cases, if the filtering model 168 determines that a command is non-adversarial (e.g., the probability of a received command being adversarial is below a configured threshold), vehicle 102 may be controlled based on the trajectory recommended by the command.

Computing device(s) 140 may include memory 142. Memory 142 may be an example of non-transitory computer-readable media. Memory 142 may store an operating system and one or more software applications, instructions, programs, and/or data to implement the methods described herein and the functions attributed to the various systems. In various implementations, the memory 142 may be implemented using any suitable memory technology, such as SRAM, SDRAM, nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some cases, memory 142 includes a teleoperation component 144, a vehicle controller 146, and a teleoperation controller 158. Teleoperation component 144 may be configured to provide teleoperation instructions to the vehicle 102 (e.g., via the teleoperation interface component 136) in response to requests for assistance from the vehicle (e.g., from the teleoperation interface component 136). Teleoperation component 144 may be configured to obtain a request for teleoperation assistance from a vehicle and obtain teleoperation command data in response to the request. Teleoperation command data may represent a recommended trajectory for the vehicle and/or the vehicle controller to follow under a specific driving scenario. Teleoperation component 144 may also be configured to record at least some of the teleoperation input and/or command transmitted to the vehicle based on the teleoperation input. Upon receiving a subsequent request, teleoperation component 144 may be configured to reproduce at least part of the former teleoperation input and/or to provide an option to activate command associated with the teleoperation input. In some cases, teleoperation component 144 may perform at least some of the techniques described in U.S. Pat. No. 10,268,191, filed Jul. 7, 2017, and entitled "Predictive Teleoperation Situational Awareness," which is incorporated by reference herein in its entirety and for all purposes.

Vehicle controller 146 (e.g., an autonomous vehicle controller) may be configured to simulate at least some of the operations that may be performed by the vehicle 102 and/or by the vehicle computing device. For example, vehicle controller 146 may include a prediction controller 148 that simulates at least some of the operations associated with the prediction component 130 of the vehicle computing device(s) 104. To simulate operations associated with the prediction component 130, prediction controller 148 may be configured to receive simulated sensor data (e.g., logged sensor data, sensor data associated with a driving scenario, and/or the like) and generate predicted trajectories for one or more dynamic objects based on the sensor data. For example, the prediction controller 148 may implement similar techniques as the prediction component 130 to predict locations of pedestrians, vehicles, and other objects over time based on their current locations, headings, velocities etc. The prediction controller 148 may provide the predicted trajectories to the planning controller 150.

As another example, vehicle controller 146 may include a planning controller 150 that simulates at least some of the operations associated with the planning component 132 of the vehicle computing device(s) 104. To simulate operations associated with the planning component 132, planning controller 150 may receive simulated localization data (e.g., logged localization data, localization data associated with a driving scenario, and/or the like), simulated perception data (e.g., logged perception data, perception data associated with a driving scenario, and/or the like), simulated prediction data (e.g., logged prediction data, prediction data associated with a driving scenario, and/or the like). The planning controller 150 may then determine a simulated trajectory and/or simulated instructions for controlling the simulated autonomous vehicle based on the received data. The planning controller 150 may determine instructions at different levels, such as high-level tasks (e.g., perform a lane change) and low-level actuation commands (e.g., target speed, acceleration, steering angle). The planning controller 150 may provide the simulated instructions to the drive component controller 152.

As an additional example, vehicle controller 146 may include a drive component controller 152 that simulates (e.g., via software operations performed on a simulation environment 154). For example, the drive component controller 152 may receive simulated trajectories and/or instructions from the planning controller 150 and simulate carrying out those instructions, such as by accelerating, braking, and/or steering a simulated autonomous vehicle, by performing operations in relation to the simulation environment 154.

This simulation performed by the drive component controller 152 may generate a simulation metric (e.g., a score, a reward, and/or the like) resulting from the simulation that may be provided to another component (e.g., to an optimizer 166). The simulation metric may be a measure of the outcome of executing operations corresponding to a trajectory and/or instructions provided by the planning controller 150 in relation to the simulation environment 154. In some examples, the simulation metric may be based at least in part on how close the simulated vehicle was to violating an operating constraint and/or how close the simulated vehicle is to an operating objective (e.g., maintaining a heading and/or velocity, distance from a target path or position). In some examples, the simulation metric may be determined upon completion of at least a segment of the simulation, such as a time step (e.g., 10 milliseconds, 100 milliseconds, 500 milliseconds, 1 second, etc. of simulation or any other discretized portion of simulation, which may correspond go one or more computing cycles), or upon completion of the simulation (e.g., after the simulation completes up to a time horizon of simulation, such as two seconds in the future, five seconds in the future, or any other time; upon completion of a mission, such as by reaching a location, dropping off a passenger, or the like). In the latter example, the simulation metric determined upon completion of the simulation may be a reward calculated for the entire simulation, which may include a sum of rewards determined at time steps and/or an additional or alternate reward associated with the entire simulation. In some examples, the simulation metric may be based at least in part on a long-term score associated with mission-related or other long-range time window (e.g., 1-second interval, 2-second interval, 5-second interval, one-minute interval, thirty-minute interval) and/or a short-term score associated with near-term time window (e.g., 10 milliseconds, 100 milliseconds, 500 milliseconds) or short-term goals, such as adherence to a trajectory. The long-term and/or short-term scores may be based at least in part on goals (e.g., mission-level goals for the long-term score or short-term goal, such as completing a trajectory, for the short-term score), trajectories (e.g., which may be a short-term goal), and/or operating constraints. In other words, mission completion, trajectories, and/or operating constraints may be used as the targets for reinforcement learning and determining the simulation metric as part of a reinforcement learning.

In some cases, the vehicle controller 146 includes components that simulate operations of other components of the vehicle 102 and/or the vehicle computing device(s) 104. For example, the vehicle controller 146 may include a perception controller that simulates at least some of the operations associated with the perception component 128 of the vehicle computing device(s) 104. As another example, the vehicle controller 146 may include a sensor controller that simulates operations of the sensor(s) 106 of the vehicle 102 by extracting data from the simulation environment 154.

Teleoperation controller 158 may be configured to control operations of the teleoperation component 144. For example, the teleoperation controller 158 may control teleoperation command provided by the teleoperation component 144 to at least one of the vehicle 102 or the vehicle controller 146. Teleoperation controller 158 may be configured to: (i) given a driving scenario reflected in the state of the simulation environment 154, determine a command that, if provided to the vehicle controller 146, causes an expected damage measure associated with the simulation environment 154 to increase (e.g., be maximized), (ii) cause the teleoperation component 144 to provide the command to the vehicle controller 146 during simulation of the driving scenario, and (iii) determine a simulation metric associated with the simulation. In some cases, given a driving scenario, teleoperation controller 158 may be configured to perform the following operations iteratively until a stopping condition is reached (e.g., for a predefined number of iterations, until the expected damage measure exceeds a threshold, until the simulation metric exceeds a threshold, and/or the like): (i) retrieve a damage model that relates one or more teleoperation command parameters to an expected damage measure (e.g., representative of the expected outcome of providing a teleoperation command associated with the parameter(s) to the vehicle controller 146 during a simulation of the driving scenario), (ii) determine, based on the damage model, value(s) for the parameter(s) that increase (e.g., maximize) the expected damage measure, (iii) determine a command based on the determined parameter value(s), (iv) cause the determined command to be provided to the vehicle controller 146 during a simulation of the driving scenario, (v) determine a simulated damage measure resulting from the simulation, (vi) update the damage model based on the simulated damage measure, and (vii) return to operation (i) if the stopping condition has not been satisfied.

Teleoperation controller 158 may include a scenario editor 162, a fuzzed synthetic engine 164, and an optimizer 166. The scenario editor 162 may be configured to generate driving scenario(s) that may be used to test the teleoperation component 144. The scenario editor 162 may generate scenarios based on log data 138. For example, a scenario may be determined based on one or more recorded conditions and/or operations of a vehicle and/or the vehicle's environment at a time proximate to a request for teleoperation command. As another example, a scenario may be determined based on a scenario that is labeled as being a dangerous condition (e.g., using a scenario classification model). As a further example, a scenario may be determined by modifying a scenario that is determined based on log data, where the modification may be based on user input. In some cases, a scenario that is determined by user modifications to a log-based scenario is referred to as a synthetic scenario. A user may modify one or more features of a scenario, such as the road condition, number and types of objects present in the scenario, and weather conditions associated with the scenario. For example, the user may generate a scenario representing a four-way intersection with various vehicles, bicycles, and pedestrians traversing crosswalks. The scenario editor 162 may provide a graphical interface for placing objects in the simulation environment. The scenarios generated by the scenario editor 162 may be configured to simulate complex real-world conditions to test the robustness of the vehicle controller 146 against adversarial teleoperation command (e.g., teleoperation command provided by an adversarial party that may have hijacked the teleoperation component 144) under various driving conditions and/or environmental conditions.

The fuzzed synthetic engine 164 may be configured to make simulated testing more robust by introducing randomness and/or variation to the driving scenarios. The fuzzed synthetic engine 164 may randomly modify the scenarios generated by the scenario editor 162.

For example, the fuzzed synthetic engine 164 may randomly change the position of a simulated vehicle, the timing of a traffic light, or the weather conditions associated with a driving scenario. In some cases, the fuzzed synthetic engine 164 may introduce various types and degrees of variation based on user-configurable parameters.

The optimizer 166 may be configured to determine which teleoperation command is likely to increase (e.g., maximize) a simulated damage measure associated with simulation of a driving scenario (e.g., a scenario generated by the scenario editor 162, a scenario generated by the scenario editor 162 and modified by the fuzzed synthetic engine 164). Optimizer 166 may determine which teleoperation command is likely to, if provided to the vehicle controller 146 while the state of the simulation environment 154 reflects a driving scenario, increase (e.g., maximize) the amount of damage that the simulated vehicle incurs. The simulated damage measure may be determined by one or more simulation metrics associated with simulation of a driving condition and transmission of a specific command to the simulated vehicle.

The optimizer 166 may be configured to determine which teleoperation command parameter(s) increase (e.g., maximize) an expected damage measure. A teleoperation command parameter may represent a feature of a recommended behavior (e.g., a recommended trajectory) associated with a corresponding teleoperation command. For example, a teleoperation command parameter may represent a set of recommended waypoint locations associated with a recommended trajectory for the vehicle. As another example, a teleoperation command parameter may represent a recommended vehicle speed while following a specific trajectory (e.g., a recommended trajectory described by the corresponding command). Optimizing an expected damage measure may help evaluate flaws and limitations of the vehicle controller 146 in the presence of destructive teleoperation instructions (e.g., if the teleoperation component 144 becomes hijacked and is used by a bad actor to cause damage to vehicles interacting with the teleoperation component 144).

The optimizer 166 may use a damage model that relates a set of inputs to the expected damage measure. The inputs may include at least one of: (i) a set of scenario features that represent various features of the driving scenario under which the expected damage measure is being computed, or (ii) a set of command parameters that represent various features of a vehicle behavior. Accordingly, the optimizer 166 may be configured to determine, given a driving scenario described by a set of scenario features, which teleoperation command described by a corresponding set of command parameters increases (e.g., maximizes an expected damage measure).

For example, in some cases, the optimizer 166 may first identify a scenario about overtaking another vehicle on a one-lane road and using an opposing lane. The optimizer 166 may determine values for a vehicle speed parameter that describes the recommended vehicle's speed during the overtaking, a first waypoint parameter that describes the location of a waypoint at which the move to the opposing lane is performed, and a second waypoint parameter that describes the location of a waypoint at which the move back to the initial lane is performed. The optimizer 166 may determine these values in a way that maximizes the likelihood that the vehicle accepts the corresponding command and the amount of time at which the vehicle will be in the opposing lane.

In some cases, the expected damage measure associated with a set of command parameters reflects both a likelihood that a vehicle controller accepts the corresponding command (e.g., operates in accordance with the corresponding command) and the damage resulting from acceptance of the corresponding command (e.g., the damage resulting from the vehicle controller being operated in accordance with the corresponding command). For example, in some cases, if a command is likely to be rejected by the vehicle controller (e.g., by a planning component of the vehicle controller, by a collision avoidance component of the vehicle controller, and/or the like), the command is likely to be associated with a low expected damage measure even if the resulting damage from the command, if accepted, is high. Accordingly, in some cases, the optimizer 166 may balance acceptance likelihood and damage scale to determine a command that maximizes an expected damage measure, as the vehicle controller may be able to determine that a command with a high damage likelihood is erroneous (e.g., leads to a collision or violates a policy) and thus avoid any damage resulting from the command.

In some cases, the optimizer 166 is configured to determine adversarial teleoperation command parameters that are predicted to maximize damage expected in simulation. The optimizer 166 may receive a driving scenario as input and optimize over possible teleoperation commands for that scenario. The teleoperation commands are parameterized by features like recommended waypoints, speeds, vehicle holds, and/or releases, each of which may be a tunable parameter. The optimizer 166 may determine the combination of parameter values that maximizes an objective expected damage function based on the simulation outcome when using those parameter values.

Different damage objective functions may be used for different scenarios. Example objective functions include functions determined based on distance between vehicles, post-encroachment time, and/or time to collision. The optimizer 166 may use Bayesian optimization and/or a sequential model-based approach to learn the relationship between parameter settings and damage outcomes in order to choose new parameter values that maximize expected damage. The optimizer 166 may iteratively determine new parameter values, use those determined parameters in simulation to detect the damage outcome, and update its internal model mapping of parameters to expected damage. Over multiple iterations, the optimizer 166 may converge on adversarial command parameter values that are highly likely to cause collisions or other failures when executed by the vehicle controller in simulation.

For example, given a scenario involving a vehicle approaching a busy intersection, the optimizer 166 may tune parameters like the vehicle's recommended speed and/or timing for entering the intersection to minimize an expected damage measure determined based on a time to collision with crossing traffic. The optimizer 166 may begin with an initial estimate that slower speeds and larger gaps are safer. Accordingly, the optimizer 166 may experiment with faster speeds and smaller gaps to detect shorter collision times. The optimizer 166 may thus update its damage model to reflect this trend.

As another example, consider a scenario for a vehicle attempting to parallel park with traffic approaching from behind. The optimizer 166 may adjust parameters like distance from the curb, speed of approach, and/or timing for pulling into the spot to minimize an expected damage measure determined based on post-encroachment time with the oncoming vehicle. The optimizer 166 may begin with an initial estimate and experiment with different parameter combinations. The optimizer 166 may thus update its damage model to reflect the trend in expected damage measure determined based on one or more simulations.

Figure 2:
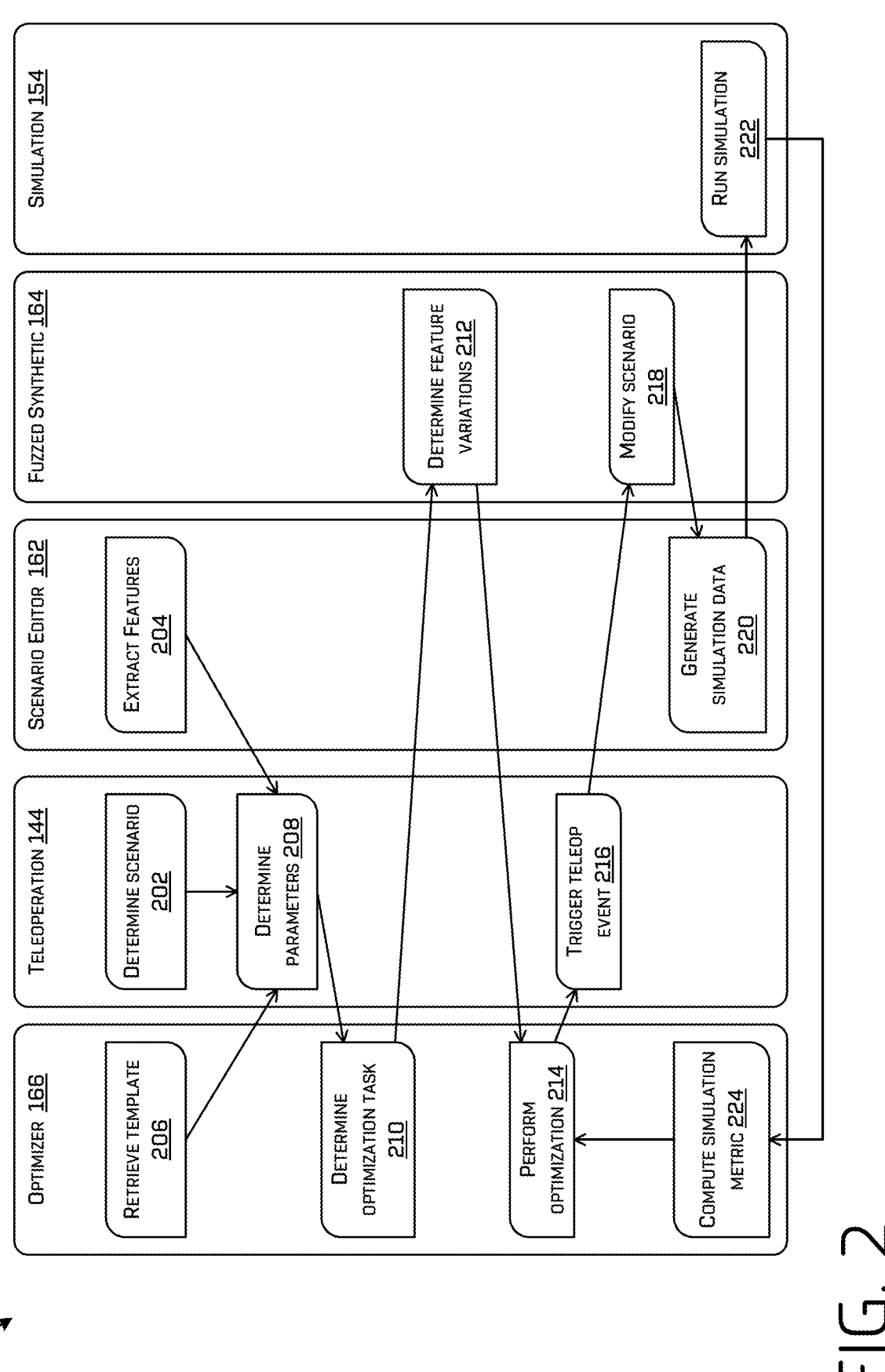
FIG. 2 is a data flow diagram of an example process for performing iterative simulation using adversarial teleoperation command.

FIG. 2 is a data flow diagram of an example process 200 for performing iterative simulation using adversarial teleoperation command. As depicted in FIG. 2, at operation 202, the teleoperation component 144 determines a driving scenario that will be used to test the vehicle controller 146. The scenario may be a recorded scenario determined based on the log data 138 or a synthetic scenario determined by adjusting a recorded scenario (e.g., based on user-provided modifications). In some cases, the driving scenario may be a recorded scenario extracted from the log data 138 collected by vehicles during real-world operation. For example, the scenario may reflect the vehicle state and environment state leading up to a request for teleoperation assistance. Alternatively, the scenario may be a synthetic scenario generated by a user modifying a recorded scenario through a graphical interface associated with the scenario editor 162. For example, the user may adjust the number and position of vehicles at an intersection. As another example, the user may adjust the quantity and positions of vehicles at an intersection in the recorded scenario via the graphical interface to create a synthetic scenario.

At operation 204, the scenario editor 162 extracts a set of scenario features. The scenario features may represent type of scenario, locations and/or types of one or more objects present in the scenario, road condition(s) associated with the scenario, weather condition(s) associated with the scenario, lighting condition(s) associated with the scenario, and/or the like. In some cases, the scenario features may be represented by a vector of a predefined size, such as a vector determined by processing a set of initial scenario features using a feature engineering layer. In some cases, the scenario editor 162 analyzes the driving scenario and extracts a set of features that characterize the scenario. These scenario features may represent the type of driving scenario (e.g., intersection, highway driving, and/or the like), the number and types of objects (e.g., vehicles, pedestrians, and/or the like), road conditions (e.g., wet, icy, and/or the like), weather conditions (e.g., rainy, sunny, and/or the like), lighting conditions, and/or like. The scenario features may be encoded into a vector representation.

At operation 206, optimizer 166 retrieves an optimization template. The optimization template may describe a set of required configuration values that the optimizer 166 needs for performing optimization. In some cases, optimizer 166 retrieves an optimization template associated with the corresponding type of driving scenario. The template may specify configuration values like optimization parameters, optimization constraints, and/or optimization objectives that will be used to perform optimization for this scenario type. Accordingly, in some cases, different scenario types may be associated with different optimization templates.

At operation 208, teleoperation component 144 combines the scenario features, the configuration values, and a set of optimization parameters that the optimizer 166 may use to optimize (e.g., maximize) an expected damage measure. In some cases, each scenario type is associated with a different set of optimization parameters. For example, the optimization parameters for an overtaking scenario may be different from the optimization parameters for pulling out of a parking spot into an oncoming lane. In some cases, teleoperation component 144 combines the scenario feature vector, configuration values from the optimization template, and optimization parameters for the optimizer 166.

At operation 210, optimizer 166 determines an initial optimization task based on the scenario features, the configuration values, and the optimization parameters. The initial optimization task may thus represent an initial driving scenario as well as configuration values and optimization parameters associated with optimizing an expected damage measure associated with the task.

At operation 212, the fuzzed synthetic engine 164 modifies the initial optimization task by introducing one or more variations (e.g., random variations) into the scenario features. In some cases, before executing the optimization, the fuzzed synthetic engine 164 modifies the initial optimization task by introducing random variations to the scenario features. This modification may make the simulation testing more robust and less predictable.

At operation 214, optimizer 166 performs optimization based on the modified optimization task. The optimization may be configured to determine which combination of values for the optimization parameter maximizes an expected damage measure. The optimization may be performed using an optimization model that relates optimization parameters and/or scenario features to an expected damage measure.

At operation 216, teleoperation component 144 maps the parameter values resulting from the optimization to parameters of a teleoperation command. For example, a parameter may be mapped to a recommended speed in the teleoperation command. As another example, a set of parameters may be mapped to a set of waypoint locations associated with the command's recommended trajectory.

At operation 218, the fuzzed synthetic engine 164 modifies the driving scenario by providing a teleoperation command associated with the mapped command parameters to the vehicle controller under the driving scenario. In some cases, the fuzzed synthetic engine 164 provides the teleoperation command to the vehicle controller 146 as part of a simulation of the original driving scenario. This simulation may evaluate how the vehicle controller 146 responds to the adversarial teleoperation command.

At operation 220, scenario editor 162 generates simulation data associated with the modified driving scenario. The simulation data may describe one or more conditions and/or one or more objects associated with the simulation environment 154. The simulation data may describe a simulated vehicle behavior that the vehicle controller should adopt as part of the simulation. In some cases, the simulation data represents the driving scenario and provided teleoperation command.

At operation 222, simulation environment 154 runs the simulation associated with the simulation data. Running the simulation may include predicting the position and/or condition of one or more objects (e.g., one or more simulated vehicles, one or more simulated pedestrians, and/or the like) at one or more times of the simulation.

At operation 224, optimizer 166 computes a simulation metric (e.g., representing a damage measure observed in the simulation outcome data) and uses the metric to update the damage model. In some cases, after operation 224, unless a stopping condition is reached, the optimizer 166 performs the optimization of operation 214 using the updated damage model and repeats operations 214-224. Accordingly, in some cases, the optimizer 166 computes the simulated damage outcome, utilizes this metric to update the damage model, and repeats the optimization process with the updated damage model until a stopping condition is reached (e.g., for a predefined number of iterations, until the expected damage measure exceeds a threshold, until the simulation metric exceeds a threshold, and/or the like).

Figures 3A, 3B:
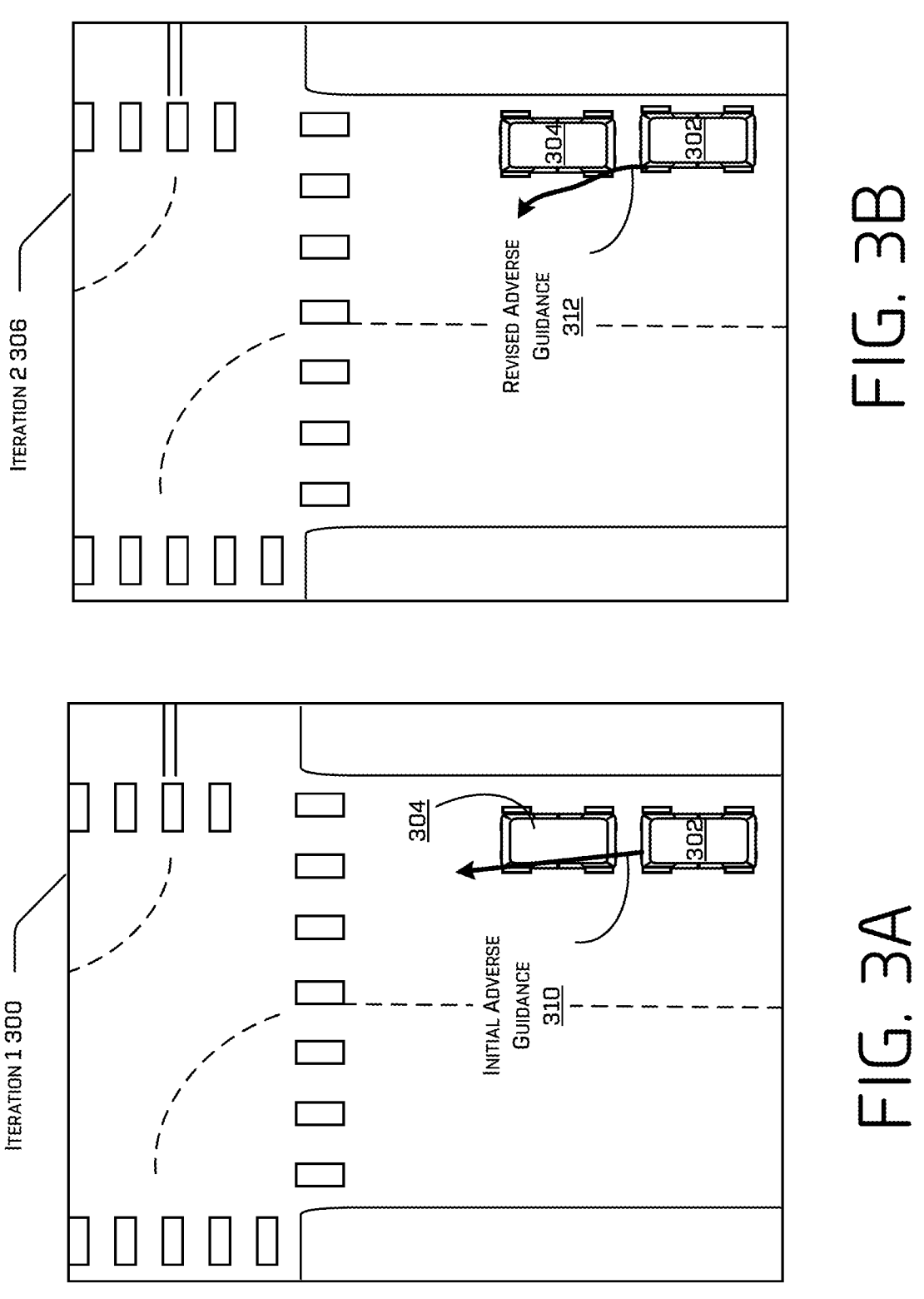
FIG. 3A provides an operational example of a first iteration of providing an adverse teleoperation command to a vehicle controller that controls operations associated with a simulated vehicle in a simulation environment.
FIG. 3B provides an operational example of a second iteration of providing an adverse teleoperation command to a vehicle controller that controls operations associated with a simulated vehicle in a simulation environment.

FIG. 3A provides an operational example 300 of a first iteration of providing an adverse teleoperation command to a vehicle controller that controls operations associated with a simulated vehicle 302 in a simulation environment. As depicted in FIG. 3A, in the operational example 300, the teleoperation component provides an initial adverse command 310 that instructs and/or recommends that the simulated vehicle 302 adopt vehicle speed(s) and follow a trajectory that causes the vehicle 302 to have a major collision with the preceding vehicle 304. In some cases, the vehicle controller may detect that the behavior recommended by this initial adverse command 310 is erroneous and reject this command.

FIG. 3B provides an operational example 306 of a second iteration of providing an adverse teleoperation command to a vehicle controller that controls operations associated with a simulated vehicle 302 in a simulation environment. As depicted in FIG. 3B, in the operational example 306, the teleoperation component provides a revised adverse command 312 that instructs and/or recommends that the simulated vehicle 302 adopt vehicle speed(s) and follow a trajectory that causes the vehicle 302 to have a minor collision with the preceding vehicle 304. The teleoperation component may provide this revised adverse command 312 based on optimization of an expected damage measure using an update damage model, where the updated damage model may reflect the observation that, in simulation of the initial adverse command 310, the initial adverse command 310 was rejected. In some cases, the vehicle controller may fail to detect that the behavior recommended by the revised adverse command 312 is erroneous and thus accept this command.

Figure 4:
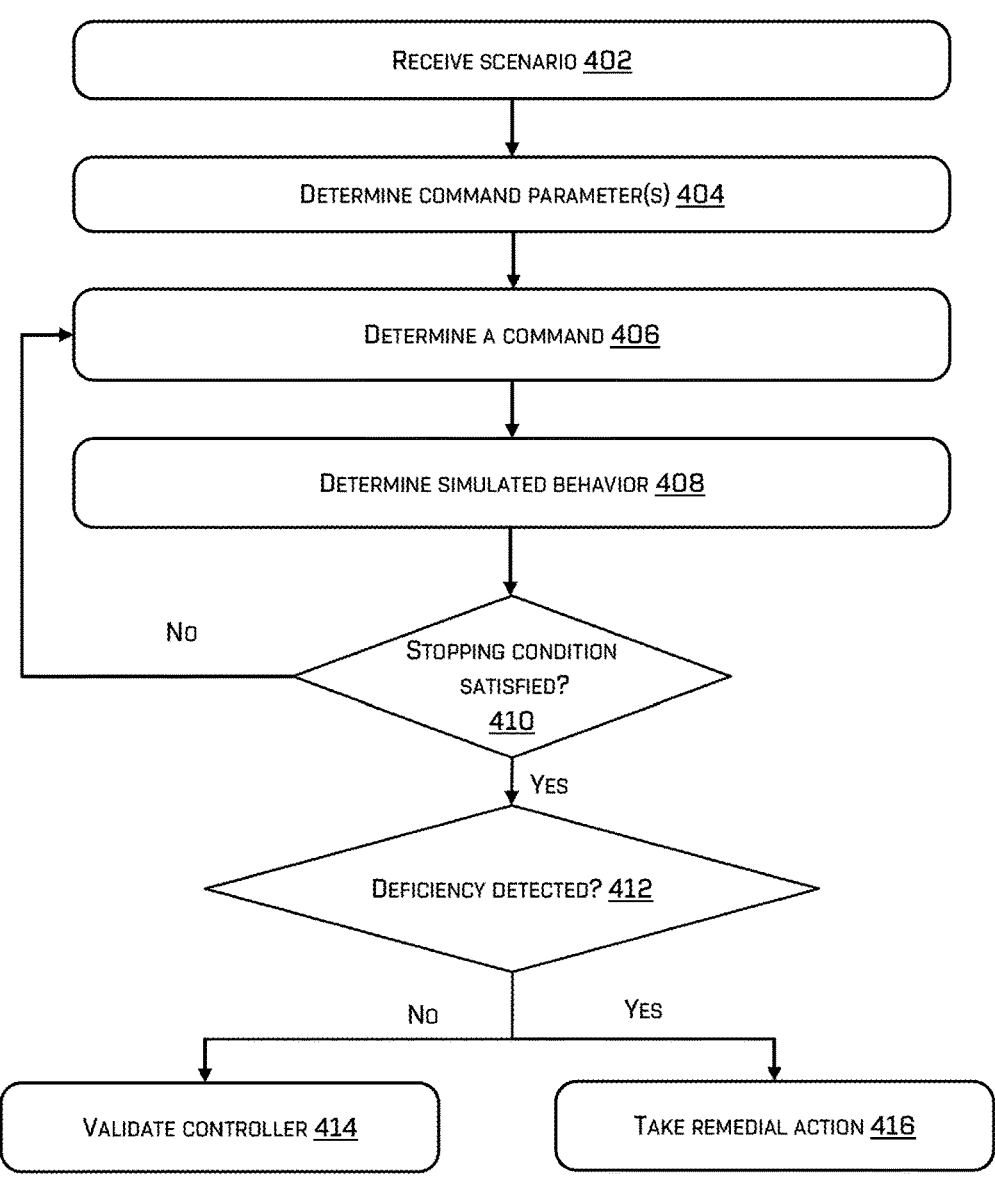
FIG. 4 is a flowchart diagram of an example process for deficiency detection using an adversarial teleoperation command.

FIG. 4 is a flowchart diagram of an example process 400 for deficiency detection using an adversarial teleoperation command. As depicted in FIG. 4, at operation 402, the process 400 includes receiving a driving scenario. The driving scenario may represent a state of a simulation environment with a simulated vehicle whose operations are controlled by a vehicle controller. The driving scenario may be determined based on at least one of: a recorded driving scenario in which a second autonomous vehicle received a second command, or a synthetic deriving scenario generated based on recorded vehicle behavior under dangerous driving conditions. A dangerous driving condition may be determined using a scenario classification model, which may be a machine learning model.

At operation 404, process 400 includes determining a set of command parameters. Examples of command parameters include a recommended vehicle speed and/or a set of one or more recommended waypoint locations.

At operation 406, process 400 includes determining a teleoperation command that optimizes an expected damage measure. The expected damage measure for a teleoperation command may describe an expected damage resulting from providing the command to a vehicle controller that controls operation(s) of a simulated vehicle in a simulation environment. In some cases, the expected damage measure represents a likelihood that the vehicle controller operates the simulated vehicle in accordance with the command after receiving the command, and an expected outcome (e.g., expected damage) associated with operation of the simulated vehicle in accordance with the command.

At operation 408, process 400 includes determining a simulated behavior of a simulated vehicle after providing the teleoperation command to the vehicle's controller. The simulated behavior may represent: (i) to what extent the vehicle controller controlled the simulated vehicle in accordance with the recommended behavior described by the determined teleoperation command, and (ii) the damage to the vehicle and/or to other object(s) resulting from the simulation. In some cases, after providing the optimized adversarial command to the vehicle controller in simulation, the process 400 includes determining the simulated behavior of the vehicle, including how closely the vehicle controller followed the command and any resulting damage.

At operation 410, process 400 includes determining whether a stopping condition is satisfied. The stopping condition may be satisfied after a predefined number of iterations and/or after a simulation metric (e.g., a simulated damage metric) exceeds a threshold. If the stopping condition is not satisfied, process 400 may return to operation 406 to perform another iteration of command parameter optimization. If the stopping condition is satisfied, process 400 may proceed to operation 412.

At operation 412, process 400 determines whether the simulated behavior indicates a deficiency. The deficiency may be associated with a component of the vehicle controller, with the teleoperation component, and/or a component of the corresponding vehicle whose operations are simulated by the vehicle controller. The deficiency may be detected based on detecting a collision, a near-collision, a constraint violation, and/or a policy violation in the simulated behavior. If no deficiency is detected, process 400 may proceed to operation 414 to validate the vehicle controller. However, if a deficiency is detected, process 400 may proceed to operation 416 to take one or more remedial actions. Examples of remedial actions include not validating the vehicle controller, determining training data for a command filtering system based on the deficiency, notifying a quality assurance team, and/or the like.

Figure 5:
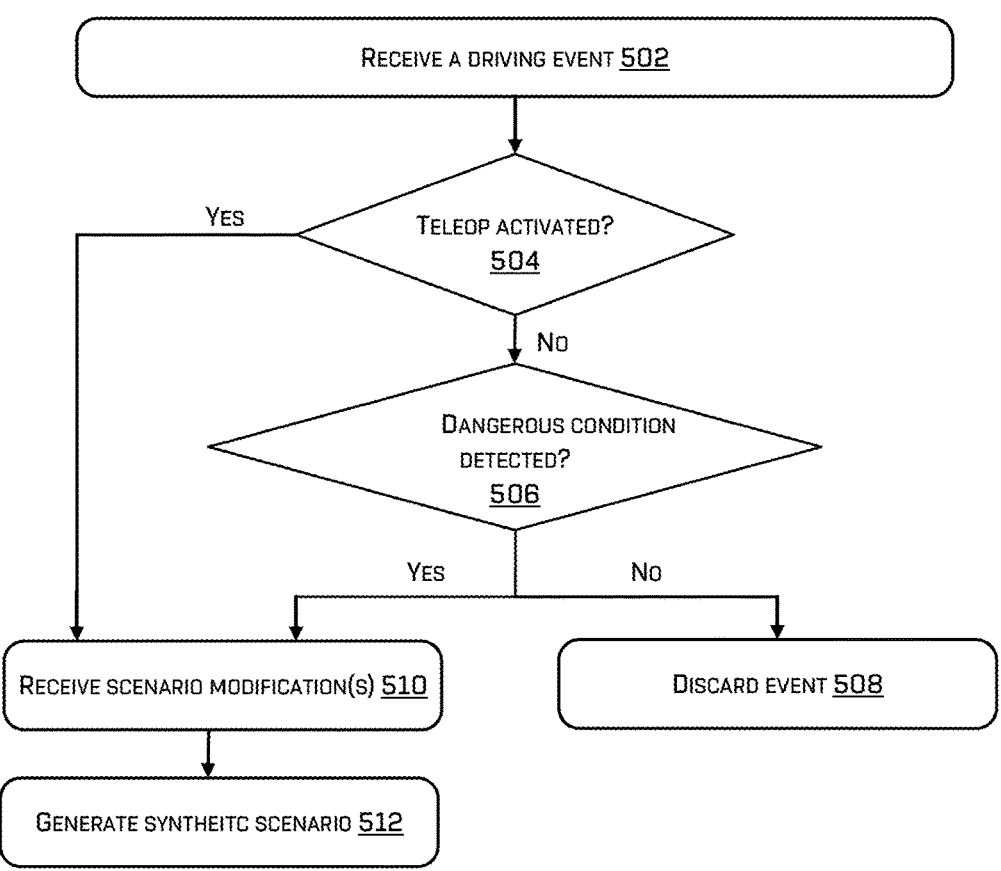
FIG. 5 is a flowchart diagram of an example process for generating a synthetic driving scenario.

FIG. 5 is a flowchart diagram of an example process 500 for generating a synthetic driving scenario. As depicted in FIG. 5, at operation 502, process 500 includes receiving a driving event represented by log data recorded by a vehicle. The log data may include a record of the vehicle's state, the surrounding environment, and any teleoperation requests and commands exchanged during a driving event. For example, a driving event log may contain timestamped sensor readings from camera(s), lidar sensor(s), radar sensor(s), and/or the like. The sensor readings may describe location coordinates of road edges, lane markings, signs, dynamic objects like other vehicles. The log data may also describe perception outputs identifying objects, prediction outputs describing predicted behaviors of identified objects, planning outputs describing adopted trajectories, and/or requests sent to a teleoperation component and any corresponding command instructions received.

At operation 504, process 500 includes determining whether the driving event was associated with a teleoperation command. A driving event may be associated with a teleoperation command if the driving event involved a request for teleoperation command and/or receiving a teleoperation command. If the driving event is associated with a teleoperation command, process 500 may proceed to operation 510. If the driving event is not associated with any command, process 500 may proceed to operation 506.

At operation 506, process 500 includes determining whether the driving event is associated with a driving condition. For example, the system may determine whether a classification associated with the event (e.g., as assigned by a classification model) indicates that the driving event is dangerous. A model may determine the event's classification. For example, the model may identify an event as dangerous if it involves at least one of one or more defined dangerous occurrences, such as sudden braking, proximity to other vehicles, obstacle avoidance maneuvers, activation of safety systems like automatic emergency braking, driving in hazardous weather or lighting conditions, unprotected left turns, and/or the like.

If the driving event is not associated with a dangerous condition, process 500 may proceed to operation 508 to discard the event. If the driving event is associated with a dangerous condition, process 500 may proceed to operation 510 to receive one or more scenario modifications. The scenario modifications may be made based on one or more random variations and/or based on one or more user-requested variations. In some cases, a fuzzing engine may apply randomized modifications like adding simulated sensor noise, adjusting pedestrian movements, changing weather patterns, and/or the like to make the scenario more robust. In some cases, a user may utilize a graphical editing interface to make requested modifications. For example, the user could add vehicles to an intersection, change lane markings, adjust traffic light patterns, and/or tune any scenario features to generate complex test cases.

At operation 512, process 500 generates the synthetic scenario by modifying the driving event based on the scenario modification(s). The synthetic scenario may thus be a fictional scenario adapted from real-world logs that may be used to test autonomous vehicle systems.

Figure 6:
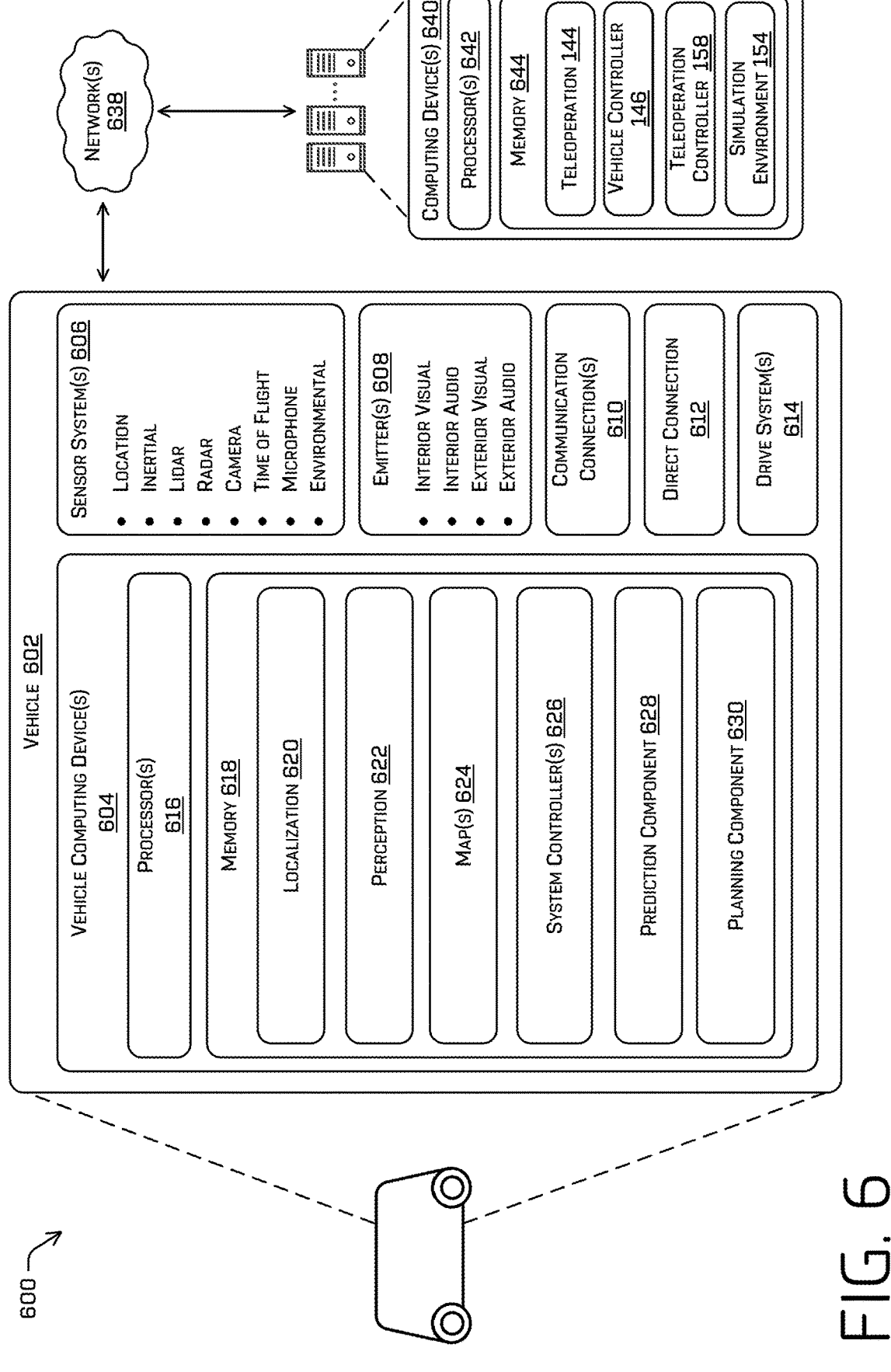
FIG. 6 depicts a block diagram of an example system for implementing various techniques described herein.

FIG. 6 depicts a block diagram of an example system 600 for implementing various techniques described herein. In some instances, the example system 600 may include vehicle 602, which may represent the vehicle 102 discussed above in FIGS. 1-5, and one or more computing devices 640, which may represent a system for adversarial teleoperation simulation as discussed above. In some instances, the vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 602 may be a fully or partially autonomous vehicle having any other level or classification. Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

The vehicle 602 may include vehicle computing device(s) 604, sensor(s) 606, emitter(s) 608, network interface(s) 610, at least one direct connection 612 (e.g., for physically coupling with the vehicle to exchange data and/or to provide power), and one or more drive system(s) 614. In this example, vehicle 602 may correspond to vehicle 102 discussed above. The system 600 may additionally or alternatively comprise vehicle computing device(s) 604.

In some instances, the sensor(s) 606 may include lidar sensors, radar sensors, ultrasonic transducers, sonar sensors, location sensors (e.g., global positioning system (GPS), compass), inertial sensors (e.g., inertial measurement units (IMUs), accelerometers, magnetometers, gyroscopes), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors), etc. The sensor(s) 606 may include at least one of the sensor(s) 106 of FIG. 1.

The vehicle 602 may also include emitter(s) 608 for emitting light and/or sound, as described above. The emitter(s) 608 may include at least some of the emitters 108 of FIG. 1.

The vehicle 602 may also include network interface(s) 610 that enable communication between the vehicle 602 and one or more other local or remote computing device(s). The network interface(s) 610 may include physical and/or logical interfaces for connecting the vehicle computing device(s) 604 to another computing device or a network, such as network(s) 638. The network interface(s) 610 may perform at least some of the operations of the network interface(s) 110 of FIG. 1.

In some instances, the vehicle 602 may include one or more drive systems(s) 614 (or drive components). In some instances, the vehicle 602 may have a single drive system 614. In some instances, the drive system(s) 614 may include one or more sensors to detect conditions of the drive system(s) 614 and/or the surroundings of the vehicle 602. By way of example and not limitation, the sensor(s) of the drive systems(s) 614 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive system(s) 614. In some cases, the sensor(s) on the drive system(s) 614 may overlap or supplement corresponding systems of the vehicle 602 (e.g., sensor(s) 606).

The drive systems(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). The drive system(s) 614 may perform at least some of the operations of the drive component(s) 112 of FIG. 1.

The vehicle computing device(s) 604 may include processor(s) 616 and memory 618 communicatively coupled with the one or more processors 616. Computing device(s) 640 may also include processor(s) 642, and/or memory 644. As described above, the memory 644 of the computing device(s) 640 may store operations associated with a vehicle controller 146, a teleoperation component 144, and/or a teleoperation controller 158.

The processor(s) 616 and/or 642 may be any suitable processor capable of executing instructions to process data and perform operations as described herein. By way of example and not limitation, the processor(s) 616 and/or 642 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 618 and/or 644 may be examples of non-transitory computer-readable media. Memory 618 and/or 644 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, memory 618 and/or memory 644 may store a localization component 620, perception component 622, maps 624, system controller(s) 626, prediction component 628, and/or planning component 630.

In at least one example, the localization component 620 may include hardware and/or software to receive data from the sensor(s) 606 to determine a position, velocity, and/or orientation of the vehicle 602 (e.g., one or more of an x-, y-, z-position, roll, pitch, or yaw). The localization component 620 may execute at least some of the operations associated with localization component 126 of FIG. 1.

Memory 618 may further include one or more maps 624 that may be used by the vehicle 602 to navigate within the environment. For the purpose of this discussion, a map may be any number of data structures modeled in two dimensions, three dimensions, or N-dimensions that may provide information about an environment, such as, but not limited to, topologies (such as intersections), streets, mountain ranges, roads, terrain, and the environment in general. In one example, a map may include a three-dimensional mesh generated using the techniques discussed herein. In some instances, the map may be stored in a tiled format, such that individual tiles of the map represent a discrete portion of an environment and may be loaded into working memory as needed. In at least one example, the one or more maps 624 may include at least one map (e.g., images and/or a mesh) generated in accordance with the techniques discussed herein. In some examples, the vehicle 602 may be controlled based at least in part on the maps 624. That is, the maps 624 may be used in connection with the localization component 620, the perception component 622, and/or the planning component 630 to determine a location of the vehicle 602, identify objects in an environment, and/or generate routes and/or trajectories to navigate within an environment.

In some instances, the perception component 622 may comprise a primary perception system and/or a prediction system implemented in hardware and/or software. The perception component 622 may perform at least some of the operations of the perception component 128 of FIG. 1.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

Prediction component 628 may include functionality to generate predicted information associated with objects in an environment. The prediction component 628 may perform at least some of the operations of the prediction component 130 of FIG. 1.

The planning component 630 may receive a location and/or orientation of the vehicle 602 from the localization component 620, perception data from the perception component 622, and/or predicted trajectories from the prediction component 628 and may determine instructions for controlling operation of the vehicle 602 based at least in part on any of this data. The planning component 630 may perform at least some of the operations of the planning component 132 of FIG. 1.

Memory 618 and/or 644 may additionally or alternatively store a mapping system (e.g., generating a map based at least in part on sensor data), a planning system, a ride management system, etc. Although localization component 620, perception component 622, the prediction component 628, the planning component 630, and/or system controller(s) 626 are illustrated as being stored in memory 618, any of these components may include processor-executable instructions, machine-learned model(s) (e.g., a neural network), and/or hardware and all or part of any of these components may be stored on memory 644 or configured as part of computing device(s) 640.

As described herein, the localization component 620, the perception component 622, the prediction component 628, the planning component 630, and/or other components of the system 600 may comprise one or more ML models. For example, the localization component 620, the perception component 622, the prediction component 628, and/or the planning component 630 may each comprise different ML model pipelines. The prediction component 628 may use a different ML model or a combination of different ML models in different circumstances. For example, the prediction component 628 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all the above ML models may comprise an attention mechanism, GNN, and/or any other neural network. An exemplary neural network is a biologically inspired algorithm which passes input data through a series of connected layers to produce an output. Each layer in a neural network may also comprise another neural network or may comprise any number of layers (whether convolutional or not). As may be understood in the context of this disclosure, a neural network may utilize machine-learning, which may refer to a broad class of such algorithms in which an output is generated based on learned parameters.

Although discussed in the context of neural networks, any type of machine-learning may be used consistent with this disclosure. For example, machine-learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 618 may additionally or alternatively store one or more system controller(s) 626, which may be configured to control steering, propulsion, braking, safety, emitters, communication, and other systems of the vehicle 602. These system controller(s) 626 may communicate with and/or control corresponding systems of the drive systems(s) 614 and/or other components of the vehicle 602.

In an additional or alternate example, vehicle 602 and/or computing device(s) 640 may communicate (e.g., transmit and/or receive messages over network(s) 638) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 602. For example, the passenger device may additionally or alternatively comprise a display and/or one or more input/output devices, such as a touchscreen, microphone, speaker, and/or the like. In some examples, the vehicle 602 may transmit messages and/or receive messages from the passenger device.

It should be noted that while FIG. 6 is illustrated as a distributed system, in alternative examples, components of the vehicle 602 may be associated with the computing device(s) 640 and/or components of the computing device(s) 640 may be associated with the vehicle 602. That is, the vehicle 602 may perform one or more of the functions associated with the computing device(s) 640, and vice versa.

CONCLUSION

While one or more examples of the techniques described herein have been described, various alterations, additions, permutations, and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 6 may utilize the processes and flows of FIGS. 1-5.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A. A system comprising: one or more processors; and one or more non-transitory computer-readable media storing computer-executable instructions that, when executed, cause the one or more processors to perform operations comprising: receiving sensor data from a sensor associated with an autonomous vehicle, the sensor data representing an environment proximate the autonomous vehicle; sending data associated with the sensor data to a teleoperation component; receiving a first command from the teleoperation component; determining, using a model and based on at least one of the sensor data or map data associated with the environment, that the first command is adversarial, wherein the model is trained based on training data representing that simulating a behavior of a vehicle controller after providing a second command to the vehicle controller resulted in collision; and controlling the autonomous vehicle by abstaining from following the first command based on determining that the first command is adversarial.

B. The system of claim A, the operations further comprising: determining a first representation of the environment based on at least one of the sensor data or the map data; determining a second representation of the first command; providing the first representation and the second representation to the model; and receiving, from the model, an output representing that the first command is adversarial.

C. The system of claim A or B, wherein controlling the autonomous vehicle further comprises controlling the autonomous vehicle based on a recovery trajectory.

D. The system of claim C, wherein the recovery trajectory is configured to cause the autonomous vehicle to stop.

E. The system of any of claims A-D, wherein: simulating the behavior is based on a driving scenario, and the driving scenario is determined based on at least one of: a first recorded driving scenario in which a second vehicle received a second command, or a synthetic driving scenario generated based on a modification to a second recorded driving scenario.

F. One or more non-transitory computer-readable media storing instructions executable by one or more processors, wherein the instructions, when executed, cause the one or more processors to perform operations comprising: receiving a vehicle controller configured to control a simulated vehicle in a simulation environment; receiving a driving scenario, wherein the driving scenario represents a state of the simulation environment; determining a parameter associated with a command provided to the vehicle controller in relation the driving scenario, wherein the parameter is configured to increase an expected damage measure associated with the simulation environment; and determining a simulated behavior of the vehicle controller after receiving the command, wherein the simulated behavior represents a deficiency associated with the vehicle controller.

G. The one or more non-transitory computer-readable media of claim F, wherein determining the driving scenario comprises: determining the driving scenario based on a recorded driving scenario in which a second vehicle received a second command.

H. The one or more non-transitory computer-readable media of claim F or G, wherein determining the driving scenario comprises: determining the driving scenario based on a synthetic driving scenario generated based on a modification to a recorded driving scenario.

I. The one or more non-transitory computer-readable media of any of claims F-H, wherein the parameter represents at least one of a speed or a waypoint location.

J. The one or more non-transitory computer-readable media of any of claims F-I, wherein the operations further comprising: determining a damage measure associated with the simulated behavior; determining an updated model by updating a model that relates the parameter to the expected damage measure, wherein updating the model is based on the damage measure; determining a second parameter associated with a second command provided to the vehicle controller during the driving scenario, wherein the second parameter is configured to increase the expected damage measure based on the updated model; and determining a second simulated behavior of the vehicle controller after receiving the second command.

K. The one or more non-transitory computer-readable media of claim J, wherein determining the damage measure comprises: determining the damage measure based on a deviation between the simulated behavior and a recommended behavior associated with the command.

L. The one or more non-transitory computer-readable media of any of claims F-K, wherein the expected damage measure represents: a likelihood that the vehicle controller operates the simulated vehicle in accordance with the command after receiving the command, and an expected outcome associated with operation of the simulated vehicle in accordance with the command.

M. The one or more non-transitory computer-readable media of any of claims F-L, the operations further comprising determining training data for a command filtering system based on the deficiency.

N. The one or more non-transitory computer-readable media of any of claims F-M, wherein the deficiency represents at least one of a collision, a near-collision, a constraint violation, or a policy violation.

O. The one or more non-transitory computer-readable media of any of claims F-N, the operations further comprising determining whether to validate the vehicle controller based on the deficiency.

P. A method comprising: receiving a vehicle controller configured to control a simulated vehicle in a simulation environment; receiving a driving scenario, wherein the driving scenario represents a state of the simulation environment; determining a parameter associated with a command provided to the vehicle controller in relation the driving scenario, wherein the parameter is configured to increase an expected damage measure associated with the simulation environment; and determining a simulated behavior of the vehicle controller after receiving the command, wherein the simulated behavior represents a deficiency associated with the vehicle controller.

Q. The method of claim P, wherein determining the driving scenario comprises: determining the driving scenario based on a recorded driving scenario in which a second vehicle received a second command.

R. The method of claim P or Q, wherein determining the driving scenario comprises: determining the driving scenario based on a synthetic driving scenario generated based on a modification to a recorded driving scenario.

S. The method of any of claims P-R, wherein the parameter represents at least one of a speed or a waypoint location.

T. The method of any of claims P-S, further comprising: determining a damage measure associated with the simulated behavior; determining an updated model by updating a model that relates the parameter to the expected damage measure, wherein updating the model is based on the damage measure; determining a second parameter associated with a second command provided to the vehicle controller during the driving scenario, wherein the second parameter is configured to increase the expected damage measure based on the updated model; and determining a second simulated behavior of the vehicle controller after receiving the second command.

What is claimed is:

1. One or more non-transitory computer-readable media storing instructions executable by one or more processors, wherein the instructions, when executed, cause the one or more processors to perform operations comprising:

receiving a vehicle controller configured to control a simulated vehicle in a simulation environment;

receiving a driving scenario, wherein the driving scenario represents a state of the simulation environment;

determining a parameter associated with a command provided to the vehicle controller in relation the driving scenario, wherein the parameter is configured to increase an expected damage measure associated with the simulation environment;

determining a simulated behavior of the vehicle controller after receiving the command, wherein the simulated behavior represents a deficiency associated with the vehicle controller performing the driving scenario;

determining that the command is an adversarial command causing the simulated behavior of the vehicle controller; and causing a real-world behavior for a real-world vehicle in a real-world environment based at least in part on determining that the command is the adversarial command.

2. The one or more non-transitory computer-readable media of claim 1, the operations further comprising:

determining the driving scenario based on a recorded driving scenario in which a second vehicle received a second command.

3. The one or more non-transitory computer-readable media of claim 1, the operations further comprising:

determining the driving scenario based on a synthetic driving scenario generated based on a modification to a recorded driving scenario.

4. The one or more non-transitory computer-readable media of claim 1, wherein the parameter represents at least one of a speed or a waypoint location.

5. The one or more non-transitory computer-readable media of claim 1, the operations further comprising:

determining a damage measure associated with the simulated behavior;

determining an updated model by updating a model that relates the parameter to the expected damage measure, wherein updating the model is based on the damage measure;

determining a second parameter associated with a second command provided to the vehicle controller during the driving scenario, wherein the second parameter is configured to increase the expected damage measure based on the updated model; and determining a second simulated behavior of the vehicle controller after receiving the second command.

6. The one or more non-transitory computer-readable media of claim 5, wherein determining the damage measure comprises:

determining the damage measure based on a deviation between the simulated behavior and a recommended behavior associated with the command.

7. The one or more non-transitory computer-readable media of claim 1, wherein the expected damage measure represents:

a likelihood that the vehicle controller operates the simulated vehicle in accordance with the command after receiving the command, and an expected outcome associated with operation of the simulated vehicle in accordance with the command.

8. The one or more non-transitory computer-readable media of claim 1, the operations further comprising determining training data for a command filtering system based on the deficiency.

9. The one or more non-transitory computer-readable media of claim 1, wherein the deficiency represents at least one of a collision, a near-collision, a constraint violation, or a policy violation.

10. The one or more non-transitory computer-readable media of claim 1, the operations further comprising determining whether to validate the vehicle controller based on the deficiency.

11. A method comprising:

receiving a vehicle controller configured to control a simulated vehicle in a simulation environment;

receiving a driving scenario, wherein the driving scenario represents a state of the simulation environment;

determining a parameter associated with a command provided to the vehicle controller in relation the driving scenario, wherein the parameter is configured to increase an expected damage measure associated with the simulation environment;

determining a simulated behavior of the vehicle controller after receiving the command, wherein the simulated behavior represents a deficiency associated with the vehicle controller performing the driving scenario;

determining that the command is an adversarial command causing the simulated behavior of the vehicle controller; and causing a real-world behavior for a real-world vehicle in a real-world environment based at least in part on determining that the command is the adversarial command.

12. The method of claim 11, wherein determining the driving scenario comprises:

determining the driving scenario based on a recorded driving scenario in which a second vehicle received a second command.

13. The method of claim 11, wherein determining the driving scenario comprises:

determining the driving scenario based on a synthetic driving scenario generated based on a modification to a recorded driving scenario.

14. The method of claim 11, further comprising:

determining a damage measure associated with the simulated behavior;

determining an updated model by updating a model that relates the parameter to the expected damage measure, wherein updating the model is based on the damage measure;

determining a second parameter associated with a second command provided to the vehicle controller during the driving scenario, wherein the second parameter is configured to increase the expected damage measure based on the updated model; and determining a second simulated behavior of the vehicle controller after receiving the second command.

15. A system comprising:

one or more processors; and one or more non-transitory computer-readable media storing computer-executable instructions that, when executed, cause the one or more processors to perform operations comprising:

receiving a vehicle controller configured to control a simulated vehicle in a simulation environment;

receiving a driving scenario, wherein the driving scenario represents a state of the simulation environment;

determining a parameter associated with a command provided to the vehicle controller in relation the driving scenario, wherein the parameter is configured to increase an expected damage measure associated with the simulation environment;

determining a simulated behavior of the vehicle controller after receiving the command, wherein the simulated behavior represents a deficiency associated with the vehicle controller performing the driving scenario;

determining that the command is an adversarial command causing the simulated behavior of the vehicle controller; and causing a real-world behavior for a real-world vehicle in a real-world environment based at least in part on determining that the command is the adversarial command.

16. The system of claim 15, wherein determining the driving scenario comprises:

determining the driving scenario based on a recorded driving scenario in which a second vehicle received a second command.

17. The system of claim 15, wherein determining the driving scenario comprises:

determining the driving scenario based on a synthetic driving scenario generated based on a modification to a recorded driving scenario.

18. The system of claim 15, wherein the parameter represents at least one of a speed or a waypoint location.

19. The system of claim 15, the operations further comprising:

determining a damage measure associated with the simulated behavior;

determining an updated model by updating a model that relates the parameter to the expected damage measure, wherein updating the model is based on the damage measure;

determining a second parameter associated with a second command provided to the vehicle controller during the driving scenario, wherein the second parameter is configured to increase the expected damage measure based on the updated model; and determining a second simulated behavior of the vehicle controller after receiving the second command.

20. The system of claim 15, wherein:

the adversarial command causing the simulated behavior of the vehicle controller is received from a teleoperator associated with a remote computing device.

* * * * *